US009343901B2

(12) United States Patent
Kuo et al.

(10) Patent No.: US 9,343,901 B2
(45) Date of Patent: May 17, 2016

(54) POWER SYSTEM AND SHORT-CIRCUIT PROTECTION CIRCUIT THEREOF

(71) Applicant: ASUSTeK COMPUTER INC., Taipei (TW)

(72) Inventors: Chung-Wei Kuo, Taipei (TW); Yu-Wei Hsu, Taipei (TW); Shao-Kang Chu, Taipei (TW); Chun-Yen Liu, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 125 days.

(21) Appl. No.: 14/285,653

(22) Filed: May 23, 2014

(65) Prior Publication Data

US 2014/0362478 A1 Dec. 11, 2014

(30) Foreign Application Priority Data

Jun. 7, 2013 (TW) .............................. 102120431 A

(51) Int. Cl.
| | |
|---|---|
| H02H 3/00 | (2006.01) |
| H02H 11/00 | (2006.01) |
| H02H 3/08 | (2006.01) |
| G05F 1/573 | (2006.01) |
| H02H 9/02 | (2006.01) |
| G05F 1/66 | (2006.01) |

(52) U.S. Cl.
CPC .............. *H02H 11/005* (2013.01); *G05F 1/573* (2013.01); *G05F 1/66* (2013.01); *H02H 3/08* (2013.01); *H02H 9/02* (2013.01)

(58) Field of Classification Search
USPC ................................................ 361/18, 86–87
See application file for complete search history.

(56) References Cited

U.S. PATENT DOCUMENTS

| 8,106,640 B2 | 1/2012 | Itakura | |
|---|---|---|---|
| 2011/0002073 A1* | 1/2011 | Fukuda | H03F 1/523 361/87 |
| 2012/0242305 A1* | 9/2012 | Goto | H02M 1/08 323/271 |
| 2013/0063121 A1* | 3/2013 | Kasai | H02M 1/32 323/311 |

FOREIGN PATENT DOCUMENTS

CN        1732612 B        6/2010

* cited by examiner

*Primary Examiner* — Danny Nguyen
(74) *Attorney, Agent, or Firm* — CKC & Partners Co., Ltd.

(57) ABSTRACT

A short-circuit protection circuit adapted to a voltage regulator module is provided. The voltage regulator module includes a high side transistor and a low side transistor. The short-circuit protection circuit includes a short-circuit detecting circuit, a first switch, and a second switch. The short-circuit detecting circuit includes a detecting terminal coupled with the high side transistor. The high side transistor is connected with the low side transistor and a load, and the low side transistor is coupled with a ground. The first switch is connected with the low side transistor in parallel. The second switch coupled between the high side transistor and the power supply. The first switch is turned on before the power supply is powered on, the short-circuit detecting circuit sends a detecting voltage to the high side transistor via the detecting terminal to determine whether the high side transistor is short-circuited to control to second switch.

8 Claims, 2 Drawing Sheets

POWER SYSTEM AND SHORT-CIRCUIT PROTECTION CIRCUIT THEREOF

CROSS-REFERENCE TO RELATED APPLICATION

This application claims the priority benefit of Taiwan application serial No. 102120431, filed on Jun. 7, 2013. The entirety of the above-mentioned patent application is hereby incorporated by reference herein and made a part of specification.

BACKGROUND OF THE INVENTION

1. Field of the Invention

The disclosure relates to a short-circuit protection circuit and, more particularly, to a short-circuit protection circuit applied to a voltage regulator.

2. Description of the Related Art

A voltage regulator module (VRM) is used to provide an appropriate operating voltage to a load (such as a CPU). If the high side transistor of the voltage regulator module (such as a high side metal oxide semiconductor (MOS)) is damaged and short-circuited, the CPU may be damaged and thus the whole electronic system cannot normally operate.

BRIEF SUMMARY OF THE INVENTION

A power system includes a power supply, a power regulator module and the short-circuit protection circuit is disclosed. The voltage regulator module regulates a power input from a power supply and supply power to a load. The voltage regulator module includes a high side transistor and a low side transistor.

A short-circuit protection circuit is coupled with the power supply and the voltage regulator module. The short-circuit protection circuit includes a short-circuit detecting circuit, a first switch, and a second switch. The short-circuit detecting circuit detecting includes a detecting terminal coupled with the high side transistor. The short-circuit detecting circuit includes a detecting terminal and is coupled with an end of the high side transistor, wherein another end of the high side transistor is connected with an end of the low side transistor and coupled with the load and another end of the low side transistor is coupled with a ground. The first switch is connected with the low side transistor in parallel. The second switch is coupled between the high side transistor and the power supply.

The first switch is conducted before the power supply is powered on, the short-circuit detecting circuit sends a detecting voltage to the high side transistor via the detecting terminal and determines whether the detecting voltage is grounded to determine whether the high side transistor is short-circuited, and then the short-circuit protection circuit selectively turns of the second switch to isolate the power supply.

As described above, when the high side transistor is damaged and short-circuited, the power system and the short-circuit protection circuit provided herein may electrically isolate the power and the load to prevent the load, being damaged.

These and other features, aspects and advantages of the present disclosure will become better understood with regard to the following description, appended claims, and accompanying drawings.

DETAILED DESCRIPTION OF THE EMBODIMENTS

Figure 1:
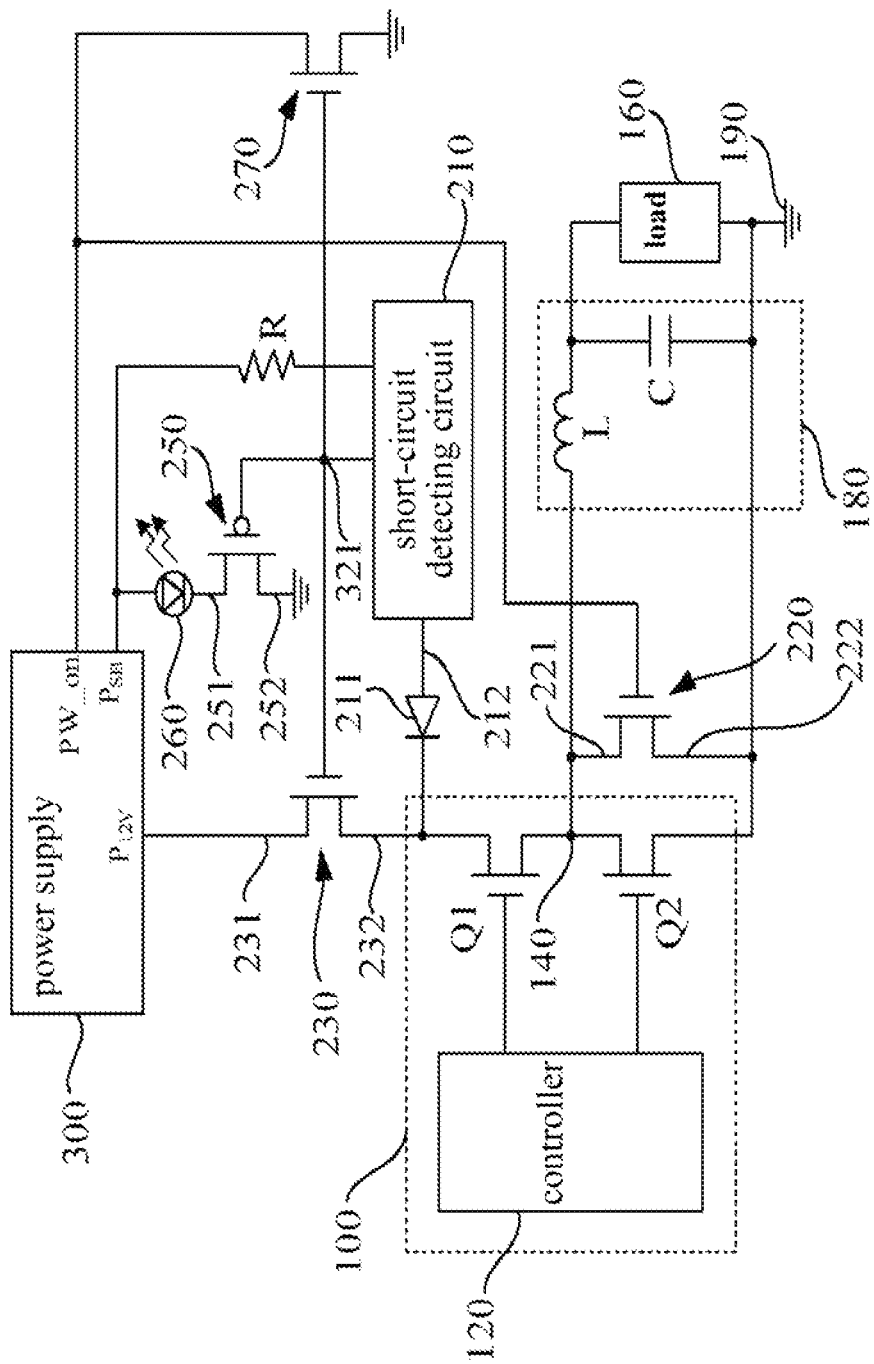
FIG. 1 is a schematic diagram showing a voltage regulator module and a short-circuit protection circuit of a power system in an embodiment.

A short-circuit protection circuit of a voltage regulator module in an embodiment is illustrated, as following referring to FIG. 1.

As shown in FIG. 1, a power system includes a voltage regulator module 100 and a short-circuit protection circuit cooperating with the voltage regulator module 100. The voltage regulator module 100 is used to regulate a power input (such as the power input $P_{12V}$ from a power supply 300) and supply power to a load 160. Before the voltage regulator module 100 is powered on the short-circuit protection circuit is used to detect whether an internal component of the voltage regulator module 100 is short-circuited to protect the load 160.

The voltage regulator module 100 includes a controller 120, a high side transistor Q1 (such as a high-side MOS), and a low side transistor Q2 (such as a low-side MOS).

If the load 160 is a central processing unit (CPU), the operating voltage of the CPU is usually less than 2.5V. In an embodiment, when the internal component of the voltage regulator module 100 is short-circuited due to the damage of the high side transistor Q1, the load 160 may be damaged when a high voltage of a power terminal of the power supply 300 (such as the power input $P_{12V}$) is directly supplied to the load 160. Consequently, to avoid the load 160 (such as the CPU) is affected by the damaged voltage regulator module 100 (such as the high side transistor Q1), the voltage regulator module 100 is detected by the short-circuit protection circuit before the voltage regulator module 100 is powered on (both the high side transistor Q1 and the low side transistor Q2 are turned off).

In the architecture, a controller 120 is electrically connected with the high side transistor Q1 and the low side transistor Q2, and the high side transistor Q1 is connected with the low side transistor Q2 in series. An end of the high side transistor Q1 and an end of the low side transistor Q2 are connected at node 140 and coupled with the load 160.

Furthermore, an inductor capacitor (LC) circuit 180 may be coupled between the node 140 and the load 160, and the LC circuit 180 may include an inductor L and a capacitor C in the embodiment.

When the voltage regulator module 100 operates, the controller 120 adjusts the operating voltage supplied to the load 160 by alternately controlling the high side transistor Q1 and the low side transistor Q2 to be turned on or turned off.

In an embodiment, the short-circuit protection circuit disclosed herein includes a short-circuit detecting circuit 210, a first switch 220, a second switch 230, a third switch 250, and a fourth switch 270.

In architecture, a detecting terminal 212 of the short-circuit detecting circuit 210 is coupled with the high side transistor Q1 via the diode 211 which is used to prevent a reverse current flowing to the detecting terminal 212. The first switch 220 is connected with the low side transistor Q2 in parallel, and a gate control terminal of the first switch 220 is connected with the power on switching terminal PW_on of the power supply 300. The voltage level of the power on switching terminal PW_on represents whether the power supply 300 is powered on. In the embodiment, the operating logic of the power on switching terminal PW_on is low enable.

Figure 2:
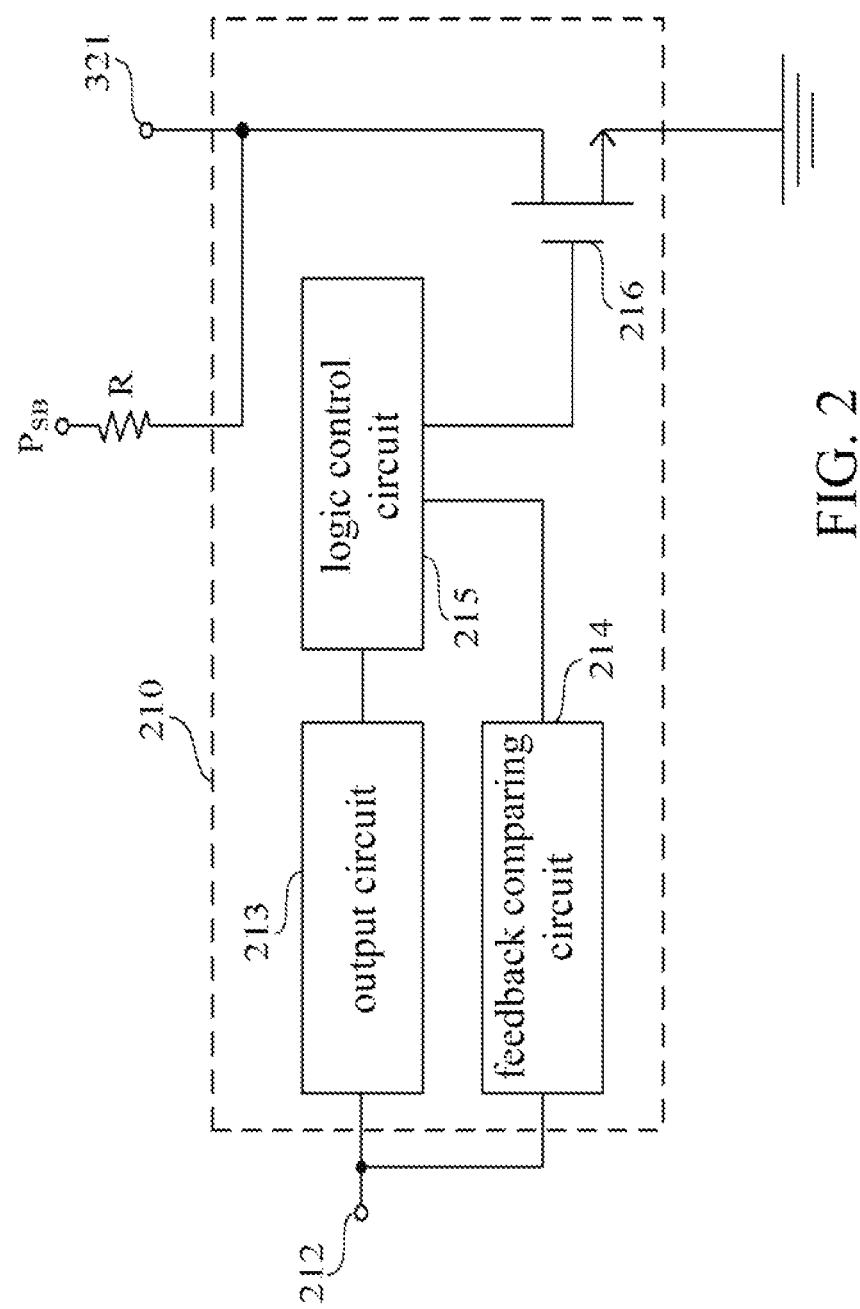
FIG. 2 is a block diagram of the short-circuit detecting circuit in an embodiment.

Please further refer to FIG. 2, which is a block diagram showing internal components of the short-circuit detecting circuit 210 in an embodiment. The short-circuit detecting circuit 210 includes an output circuit 213, a feedback comparing circuit 214, a logic control circuit 215, and a fifth switch 216.

In the embodiment, when the power supply 300 is not powered on the voltage level of the power on switching terminal PW_on is high (that is to say, the operating logic is low enable), and the power on switching terminal PW_on with high voltage level controls the first switch 220 to be conducted and connects the node 140 to the ground via the first switch 220.

Before the power supply 300 is powered on, the output circuit 213 of the short-circuit detecting circuit 210 sends a detecting voltage via the detecting terminal 212 to the high side transistor Q1 of the voltage regulator module 100. If the high side transistor Q1 is damaged and short, the detecting voltage input by the detecting terminal 212 discharges to the ground 190 via the short-circuit high side transistor Q1 and the conducted first switch 220. As the short-circuit high side transistor Q1 and the conducted first switch 220 make the detecting terminal 212 be coupled with the ground 190, the voltage level of the detecting terminal 212 is low (grounded).

If the high side transistor Q1 is not short-circuited, the voltage level of the detecting terminal 212 may keep at the original voltage level. The detecting voltage is less than a rated voltage (such as 1.5V) of the load 160. For example, the load 160 is a CPU, and the voltage level of the detecting terminal 212 of the short-circuit detecting circuit 210 is 1.5V, the voltage which can be supported by the CPU is usually less than 2.5V since the voltage level of the detecting terminal 212 is less than the rated voltage of the load 160, the load 160 may not be damaged even if the first switch 220 is not conducted.

The feedback comparing circuit 214 of the short-circuit detecting circuit 210 is used to detect the voltage level of the detecting terminal 212 to determine whether the high side transistor Q1 is short-circuited currently and inform the logic control circuit 215.

If the high side transistor Q1 is short-circuited, the logic control circuit 215 controls the fifth switch 216 to be conducted, and pulls down the voltage level of a power state output terminal 321 of the short-circuit detecting circuit 210 at a low level. When the power state output terminal 321 is pulled to a low level, the second switch 230 and the fourth switch 270 are turned of and the third switch 250 is conducted.

At this moment, the second switch 230 is open to electrically isolate the power input $P_{12V}$ of the power supply 300 and the load 160, which protects the load 160 effectively. Furthermore, when the power state output terminal 321 is pulled to the low level, the fourth switch 270 is turned of (that is to say, the voltage level of the power on switching terminal PW_on is not pulled down), to make the voltage level of the power on switching terminal PW_on keep at to high level, which represents that the power supply 300 is not powered on.

If the high side transistor Q1 is damaged and short-circuited, the power state output terminal 321 of the short-circuit detecting circuit 210 is pulled to the low level to conduct the third switch 250. A standby voltage $P_{SB}$ of the power supply 300 may turn on the luminous component 260 to inform the user that the high side transistor Q1 is damaged and short-circuited.

If the high side transistor Q1 is not short-circuited, the logic control circuit 215 controls the fifth switch 216 to be turned off and sets the power state output terminal 321 at a logic high level. For example, the standby voltage $P_{SB}$ provided by the power supply 300 sets the power state output terminal 321 to the logic high level via a resistor R, as shown in FIG. 2.

When the power state output terminal 321 is set at the logic high level, the second switch 230 and the fourth switch 270 are turned on and the third switch 250 is turned off. At the moment, the power input $P_{12V}$ of the power supply 300 may connect to the voltage regulator module 100 via the second switch 230 to make the voltage regulator module 100 normally operate to drive the load 160.

When the power state output terminal 321 is at the logic high level, the fourth switch 270 is conducted. The conducted fourth switch 270 makes the voltage level of the power on switching terminal PW_on switch to a low level (which represents that presents the power supply 300 is powered on). Additionally, since the voltage level of the power on switching terminal PW_on changes to the low level, the first switch 220 is turned off, that is to say, the short-circuit detecting function of the high side transistor Q1 is stopped.

Furthermore, if the high side transistor Q1 does not arise short-circuited, the power state output terminal 321 of the short-circuit detecting circuit 210 is at the logic high level to make the third switch 250 open. Consequently, the luminous component 260 is not luminous at the moment, which represents that the high side transistor Q1 normally operates.

The luminous component 260 may be a luminous diode or other light sources. The first switch 220, the second switch 230, and the third switch 250 may be metal-oxide semiconductors (MOS), bipolar junction transistors (BJT), or other electronic switches. For example, the first switch 220, the second switch 230, and the fourth switch 270 may be NMOSs, and the third switch 250 may be a PMOS.

The operating logic of the power on switching terminal PW_on of the power supply 300 is low enable in the embodiment, which is not limited herein. Persons have ordinary skill in the art may know that high enable may instead of the low enable, which may be achieved by replacing the switching logic of the switch components (such as P type or N type).

The short-circuit detecting circuit 210 is a standby circuit, it may include a switching circuit or a low dropout regulator.

Although the present disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A short-circuit protection circuit adapted to a voltage regulator module that regulates a power input from a power supply and supply power to a load, the voltage regulator module includes a high side transistor and a low side transistor, the short-circuit protection circuit comprising:
   a short-circuit detecting circuit including a detecting terminal coupled with an end of the high side transistor, and another end of the high side transistor is connected with an end of the low side transistor and coupled with the load, and another end of the low side transistor is coupled with a ground;
   a first switch connected with the low side transistor in parallel; and
   a second switch coupled between the high side transistor and the power supply,
   wherein the first switch is conducted before the power supply is powered on, the short-circuit detecting circuit sends a detecting voltage to the high side transistor via the detecting terminal and determines whether the detecting voltage is grounded and whether the high side transistor is short-circuited, and then the short-circuit protection circuit selectively turns off the second switch to isolate the power supply.

2. The short-circuit protection circuit according to claim 1, further comprising:
a fourth switch coupled between the ground and a power on switching terminal of the power supply, wherein the fourth switch is turned off to stop the power supply being powered on when the short-circuit detecting circuit determines the high side transistor is short-circuited.

3. The short-circuit protection circuit according to claim 1, wherein when the short-circuit detecting circuit determines that the high side transistor is not short-circuited, the first switch is turned off and the second switch is turned on, and the power supply is powered on and supplies power to the voltage regulator module via the second switch.

4. The short-circuit protection circuit according to claim 1, wherein the detecting voltage is lower than a rated voltage of the load.

5. The short-circuit protection circuit according to claim 1, further comprising:
a luminous component coupled with the power supply; and
a third switch coupled with the luminous component and the short-circuit detecting circuit, wherein the third switch is turned on when the short-circuit detecting circuit determines the high side transistor is short-circuited.

6. The short-circuit protection circuit according to claim 1, further comprising:
a diode for preventing reverse current flowing to the detecting terminal, wherein the detecting terminal of the short-circuit detecting circuit is coupled with the high side transistor via the diode.

7. The short-circuit protection circuit according to claim 1, further comprising:
an output circuit coupled with the detecting terminal for sending the detecting voltage to the high side transistor;
a feedback comparing circuit coupled with the detecting terminal for receiving a voltage level of the detecting terminal to determine whether the high side transistor is short-circuited;
a fifth switch coupled with a power state output terminal of the short-circuit detecting circuit; and
a logic control circuit alternatively turning on or turning off the fifth switch according to the determining result of the feedback comparing circuit to change the voltage level of the power state output terminal.

8. A power system, comprising:
a power supply;
a voltage regulator module coupled with the power supply to regulate a power input from the power supply and supply power to a load, the voltage regulator module includes a high side transistor and a low side transistor; and
a short-circuit protection circuit coupled with the power supply and the voltage regulator module, wherein the short-circuit protection circuit includes:
a short-circuit detecting circuit including a detecting terminal coupled with an end of the high side transistor, wherein another end of the high side transistor is connected with an end of the low side transistor and coupled with the load, and another end of the low side transistor is coupled with a ground;
a first switch is connected with the low side transistor in parallel; and
a second switch coupled between the high side transistor and the power supply,
wherein the short-circuit protection circuit turns on the first switch before the power supply is powered on, the short-circuit protection circuit sends a detecting voltage to the high side transistor via the detecting terminal, and determines whether the detecting voltage is grounded to determine whether the high side transistor is short-circuited, and then the short-circuit protection circuit selectively turns off the second switch to isolate the power supply.

\* \* \* \* \*